United States Patent [19]
Toews

[11] Patent Number: 5,839,272
[45] Date of Patent: Nov. 24, 1998

[54] DUAL CONCENTRIC POPPET VALVES FOR MAINTAINING SUBSTANTIALLY CONSTANT THE RATIO OF TWO FLUID FLOWS OVER AN OPERATING RANGE OF VALVE OPENING

[75] Inventor: Hans G. Toews, East Aurora, N.Y.

[73] Assignee: Moog Inc., East Aurora, N.Y.

[21] Appl. No.: 360,587

[22] Filed: Dec. 21, 1994

[51] Int. Cl.$^6$ .................................................. F02K 9/00
[52] U.S. Cl. ........................... 60/240; 60/39.27; 239/423
[58] Field of Search .......................... 60/741, 734, 39.27, 60/240, 39.824; 239/237, 240, 423, 433; 137/898, 605

[56] References Cited

U.S. PATENT DOCUMENTS

| | | | |
|---|---|---|---|
| 2,643,916 | 6/1953 | White et al. | 239/423 |
| 2,907,529 | 10/1959 | Ghelfi | 239/423 |
| 2,933,259 | 4/1960 | Raskin | 239/423 |
| 3,074,231 | 1/1963 | Klein | 60/39.27 |
| 3,215,352 | 11/1965 | Meraz, Jr. | 60/240 |
| 3,527,056 | 9/1970 | Hoffman | 60/240 |
| 3,534,909 | 10/1970 | Paine | 60/39.27 |
| 3,897,008 | 7/1975 | Dettling et al. | 239/410 |

*Primary Examiner*—Timothy S. Thorpe
*Assistant Examiner*—Ted Kim
*Attorney, Agent, or Firm*—Phillips, Lytle, Hitchcock, Blaine & Huber

[57] ABSTRACT

A dual concentric poppet valve assembly (44) includes an assembled body (45) having an opening (55) therethrough and having a sealing surface (56) surrounding the opening. A first member (46) is mounted in the body opening for axial movement relative to the body. The first member has a first sealing surface (70) arranged to be moved toward and away from the body sealing surface (56) to define a first variable-area orifice (96) therebetween. The first member has a concentric opening (72) therethrough and has a second sealing surface (71) surrounding the first member opening. A second member (48) is mounted in the first member opening for co-axial movement relative to the first member. The second member has a sealing surface (83) arranged to be moved toward and away from the first member second sealing surface (71) to define a second variable-area orifice (98) therebetween. The device further includes an actuator (49) for selectively moving the first member relative to the body and for simultaneously moving the second member relative to the first member so that the ratio of the areas of the first and second orifices will remain substantially constant within an operating range of movement.

9 Claims, 4 Drawing Sheets

5,839,272

DUAL CONCENTRIC POPPET VALVES FOR MAINTAINING SUBSTANTIALLY CONSTANT THE RATIO OF TWO FLUID FLOWS OVER AN OPERATING RANGE OF VALVE OPENING

TECHNICAL FIELD

The present invention relates generally to the field of poppet valves for mixing a plurality of fluids, and, more particularly, to an improved dual concentric poppet valve that is particularly adapted for use as a liquid-fueled rocket engine injector and which maintains substantially constant the ratio of two fluid flows (e.g., a propellant and an oxidizer) over a range of permissible valve opening (e.g., from zero to a maximum).

BACKGROUND ART

It is well known to use hypergolic fluids in liquid-fueled rocket engines. These fluids, a propellant and an oxidizer, will ignite upon contact with one another. Thus, there is no need for any mechanism or device to ignite the mixture. By the same token, it is desirable to maintain an optimal propellant-to-oxidizer ratio at various degrees of valve opening. However, such mixing of two hypergolic fluids is only one illustrative example of possible situations in which it is desired to controllably mix two fluids.

For example, in U.S. Pat. No. 2,063,396, it is desired to maintain a fuel-air mixture in a gas burner. In U.S. Pat. No. 2,643,916, it is desired to maintain a desired fuel-air mixture between a liquid fuel (i.e., oil) and air. As shown in the '916 patent, it is also known to provide two concentric poppet valves that are operatively arranged and configured such that two fluids will be discharged outwardly from respective orifices in intersecting annular sprays or streams. See also, U.S. Pat. Nos. 2,730,433, 3,074,231 and 3,897,008, the aggregate disclosures of which are hereby severally incorporated by reference. Each of these patents discloses an arrangement having dual concentric poppet valves.

These devices typically have an annular movable poppet that is operated by a hydraulic or electromechanical servoactuator, and that has frusto-conical seal surfaces that are adapted to simultaneously engage facing inner and outer frusto-conical seats to control the flows of the two serviced fluids through orifices formed between the poppet surfaces and their cooperative respective seats. As the poppet is moved away from these seats, the respective orifices open, and fuel and oxidizer are sprayed into the rocket combustion chamber in conical sheets that intersect to optimize mixing and burning. In the simplest form, where the poppet moves axially and the seat angles are equal, the flows of fuel and oxidizer will be approximately equal and the device will substantially maintain a 1:1 ratio of fuel-to-oxidizer over the poppet operating displacement range (i.e., the injector throttling range). The fuel-to-oxidizer ratio may be selectively changed by making the poppet seat angles unequal, since the injector opening is a function of the axial poppet displacement from lift-off and the sine of the seat angle. However, there are practical limits to the ratio that can be achieved by varying this design parameter.

Recent advances in combustion chamber design to shorten overall rocket motor length have required that the mean angle of the intersecting injection cones flare outwardly from the engine axis, instead of being parallel to the axis as in earlier designs. Hence, it is not feasible to use a conventional dual-surface axially-movable poppet in conjunction with two fixed concentric frusto-conical seats.

Accordingly, it would be generally desirable to provide an improved dual concentric poppet valve which can be designed to maintain a wide range of predetermined ratios of two discharged fluids, which is not limited by axial movement of the poppet, and which allows flexibility in the design of the injection angle.

DISCLOSURE OF THE INVENTION

With parenthetical reference to the corresponding parts, portions or surfaces of the disclosed embodiment, merely for purposes of illustration and not by way of limitation, the present invention broadly provides an improved dual concentric poppet valve (44).

The improved valve broadly includes: a body (45) having an opening therethrough and having a sealing surface (56) surrounding said opening; a first member (46) mounted in the body opening for axial movement relative to the body opening, the first member having a first sealing surface (70) arranged to be moved toward and away from the body sealing surface (56) to define a first variable-area orifice ($O_1$) therebetween, the first member having an axial opening therethrough and having a second sealing surface (71) surrounding the first member opening; a second member (48) mounted in the first member opening for co-axial movement relative to the first member opening, the second member having a sealing surface (83) arranged to be moved toward and away from the first member second sealing surface to define a second variable-area orifice ($O_2$) therebetween; and actuation means (49) for selectively moving the first member relative to the body and for simultaneously moving the second member relative to the first member so that the ratio of the areas of the first and second orifices ($O_1$, $O_2$) will remain substantially constant within an operating range of valve opening. In the preferred embodiment, this range of valve opening varies from zero (i.e., valve closed) to a maximum value (i.e., valve fully opened).

In the preferred embodiment, the first member is constrained against rotational movement relative to the body, and the second member is constrained against rotational movement relative to the first member. The first sealing surface is also adapted to selectively engage the body sealing surface to selectively close the first orifice, and the second member sealing surface is adapted to selectively engage the first member second sealing surface to selectively close the second orifice. In addition, the first and second orifices may be closed or opened simultaneously. Alternatively, it is also possible that one orifice will intentionally open or close prior to the opening or closing of the other orifice.

In the preferred embodiment, the actuation means simply includes a rotatable member (93) having a first mechanical gain means (95) and second mechanical gain means (94). The rotatable member is arranged to be selectively rotated by a motor (93), and provides a common input (e.g., rotational movement) to each of the two mechanical gain means. In the illustrated form, the first mechanical gain means may simply be a first screw thread connection between the actuator rotating output and the first member, and the second mechanical gain means may be a second screw thread connection between the actuator rotating output and the second member. In this form, the pitch of the second thread is greater than the pitch of the first thread.

The invention may further comprise means for supplying a pressurized first fluid to the first orifice, and means for supplying a pressurized second fluid to the second orifice. These two orifices may be operatively arranged to discharge annular intersecting sprays of the respective fluids so as to effect a mixing of such discharged fluids. One fluid may be a fuel and the other fuel may be an oxidizer. These two fluids (i.e., liquids, gases, or a combination thereof) may be either hypergolic or non-hypergolic.

Accordingly, the general object of this invention is to provide an improved dual concentric poppet valve for controlling the flows of two fluids.

Another object is to provide such an improved dual concentric poppet valve in which the ratio of the flows of two controlled fluids is maintained substantially constant over a permissible range of valve opening.

Still another object is to provide such an improved dual concentric poppet valve in which the ratio of the discharged flows of two fluids is maintained substantially constant in a manner independent of the geometry of the various poppet (s) relative to their associated seats.

These and other objects and advantages will become apparent from the foregoing and ongoing written specification, the drawings, and the appended claims.

DESCRIPTION OF THE PREFERRED EMBODIMENTS

Figures 1, 2A, 2B:
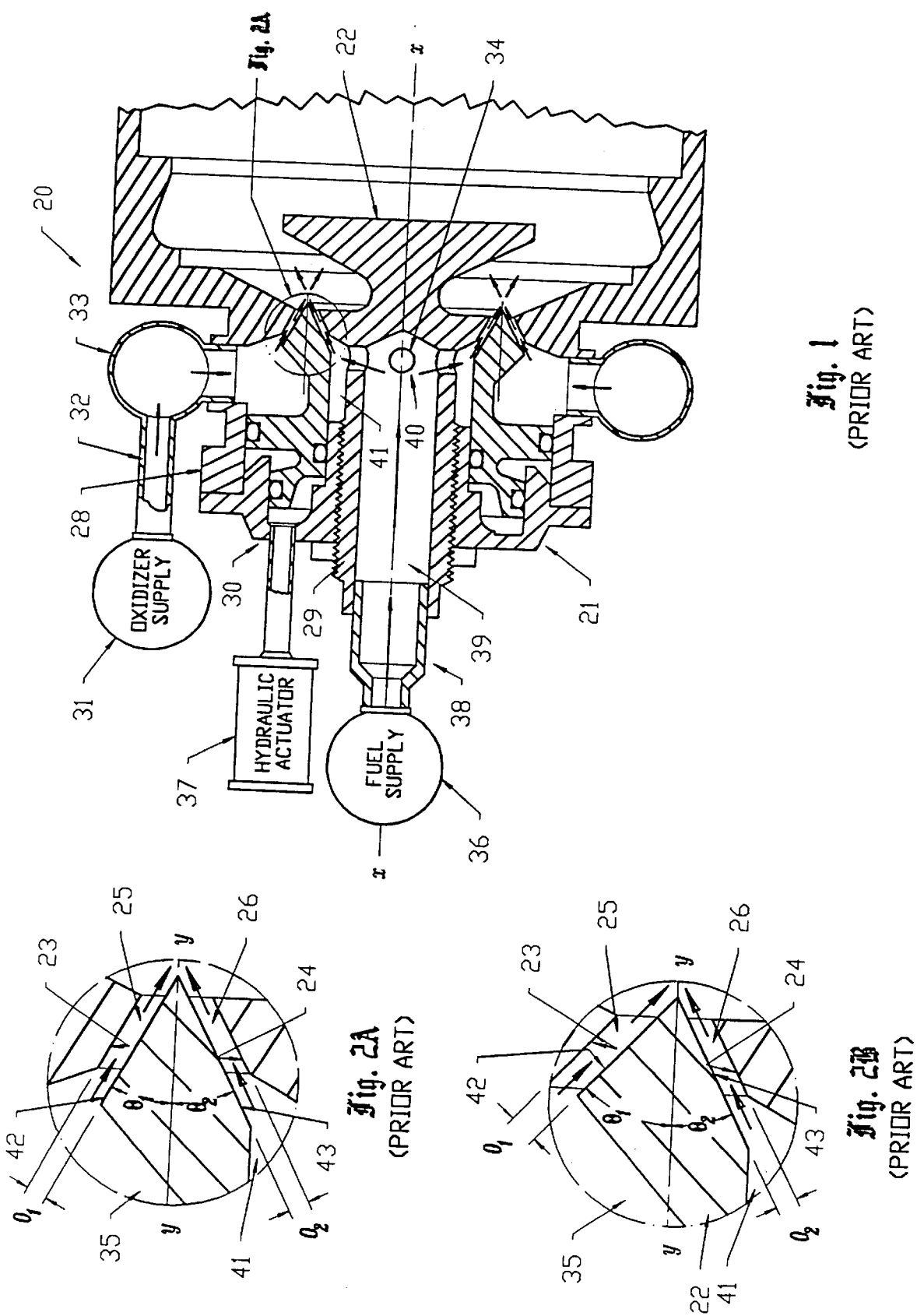
FIG. 1 is a fragmentary longitudinal vertical sectional view of a prior art annular stream variable-area injector, such as shown and described in U.S. Pat. No. 3,074,231.
FIG. 2A is an enlarged fragmentary vertical sectional view of the symmetrical annular poppet member shown within the indicated circle in FIG. 1, this view illustrating that operation of the prior art device was dependent upon the geometry of the poppet element relative to the two seats.
FIG. 2B is an enlarged fragmentary vertical sectional view of an alternative annular poppet member that might be used in the injector shown in FIG. 1, this view showing the alternative poppet member as being non-symmetrical.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Referring now to the drawings, and, more particularly, to FIGS. 3–11 thereof, the present invention broadly provides an improved dual concentric poppet valve. However, before proceeding to a discussion of the improved valve, it is deemed advisable to first review the structure and operation of a prior art dual concentric poppet valve injector.

Prior Art Form (FIGS. 1, 2A and 2B)

Referring now to FIGS. 1, 2A and 2B, a representative prior art dual concentric poppet valve assembly is generally indicated at 20. This form of device is more fully shown and described in U.S. Pat. No. 3,074,231, the aggregate disclosure of which is hereby incorporated by reference. This prior art device is also known as an annular stream variable-area injector. In any event, the prior art device 20 has a horizontally-elongated body, generally indicated at 21, and has an annular poppet generally indicated at 22, mounted for axial movement along horizontal axis x—x toward and away from a pair of frusto-conical seats 23, 24 (FIG. 2A) provided on the body to control the flows of two fluids through first and second annular variable-area orifices 25, 26, respectively.

As best shown in FIG. 1, the assembled body includes an outer part 28 and an inner part 29 joined together by an annular coupling member 30. Oxidizer is provided from a suitable source 31 through a conduit 32 to an annular chamber within toroidal enclosure 33. Oxidizer within this chamber is delivered via radial passages 34 to an annular chamber 35 formed between the body and the poppet 22. Chamber 35 continuously communicates with first orifice 25.

Fuel is provided from a suitable source 36 through a diverging fitting 38 to the interior of a blind hole 39 extending rightwardly and axially into the body inner part 29 from its left end face. Hole 39 communicates via a plurality of holes, severally indicated at 40, with an annular chamber 41 defined between the body inner part and the poppet. Chamber 41 continuously communicates with the second variable-area orifice 26. Thus, pressurized oxidizer is continuously supplied to annular chamber 35, and is arranged to be discharged through first orifice 25 in the form of an inwardly- and rightwardly-directed frusto-conical spray. Pressurized fuel is continuously provided to annular chamber 41, and is arranged to be discharged through second orifice 26 in the form of an outwardly- and rightwardly-directed frusto-conical spray. These two discharged sprays are directed toward one another to intersect, and to cause the discharged fuel and oxidizer to mix in a combustion chamber. If the fuel and oxidizer are hypergolic in nature, they will ignite on contact, and the products of combustion will create thrust. Poppet 22 is arranged to be moved relative to the body by means of a hydraulic actuator 37.

FIG. 2A is an enlarged detail view of the poppet head and the two seats, and illustrates that the operation of the prior art device is dependent upon the geometry of the two annular poppet surfaces relative to the two annular seats. In this form, the poppet element is adapted to be moved along a line of movement y-y parallel to poppet axis x—x The valve element has a rightwardly- and an outwardly-facing frusto-conical surface 42 arranged to face body outer part surface 23, and has a rightwardly- and inwardly-facing frusto-conical surface 43 arranged to face body inner part surface 24. As shown in FIG. 2, surfaces 42 and 43 are severally inclined at an angle θ of about 30° from the line of poppet movement y—y. Moreover, facing sealing surfaces 23, 24 are also arranged at equal angles with respect to axis y—y. Thus, as the poppet 22 moves rightwardly relative to the body, the first and second orifices both proportionally decrease in area. Conversely, when the poppet member is moved leftwardly relative to the body, the areas of the first and second orifices both proportionally increase. Since the diameters of the sealing surfaces are almost equal, the two metering orifice areas, $O_1$ and $O_2$, are essentially equal. Thus, if the fuel and oxidizer are pressurized equally, the flows through the first and second orifices will be in a ratio of 1:1.

In order to design such a valve having a different fuel-to-oxidizer ratio, it would be necessary to vary the respective angles, $\theta_1$ and $\theta_2$, of surfaces 42, 23 and 43, 24, respectively, as shown in FIG. 2B. In this alternative arrangement, the same reference numerals have again been used to indicate like parts and surfaces. The salient difference is that whereas the poppet head surfaces were symmetrical about poppet line of movement y—y (i.e., $\theta_1=\theta_2=30°$) in FIG. 2A, these surfaces are non-symmetrical about line of movement y—y in FIG. 2B. In FIG. 2B, angle $\theta_1$ is about 43°, and angle $\theta_2$ is about 30°. Thus, since surfaces 43, 24 and 42, 23, respectively, must sealingly engage one another in area contact at valve closing, when the poppet moves away from the body along line of movement y—y for a distance Δy, the orifices $O_1$ and $O_2$ will be in proportion to the sine of angles $\theta_1$ and $\theta_2$, respectively. Or, $$O_1 = \Delta y \sin \theta_1$$
$$O_2 = \Delta y \sin \theta_2$$
$$\frac{O_1}{O_2} = \frac{\sin \theta_1}{\sin \theta_2}$$

Thus, in FIG. 2B, as the poppet moves along line of movement y—y, if the angles $\theta_1$, $\theta_2$ are unequal, then the orifice areas $O_1$, $O_2$ will vary proportionally, but not equally as the poppet moves relative to the body. On the other hand, if angles $\theta_1$, $\theta_2$ are equal, then the orifice areas will vary equally per unit displacement of the poppet member along line y—y. However, there are practical limits to the ratios that may be achieved by selectively varying angles $\theta_1$, $\theta_2$.

The Inventive Valve (FIGS. 3–11)

Figure 3:
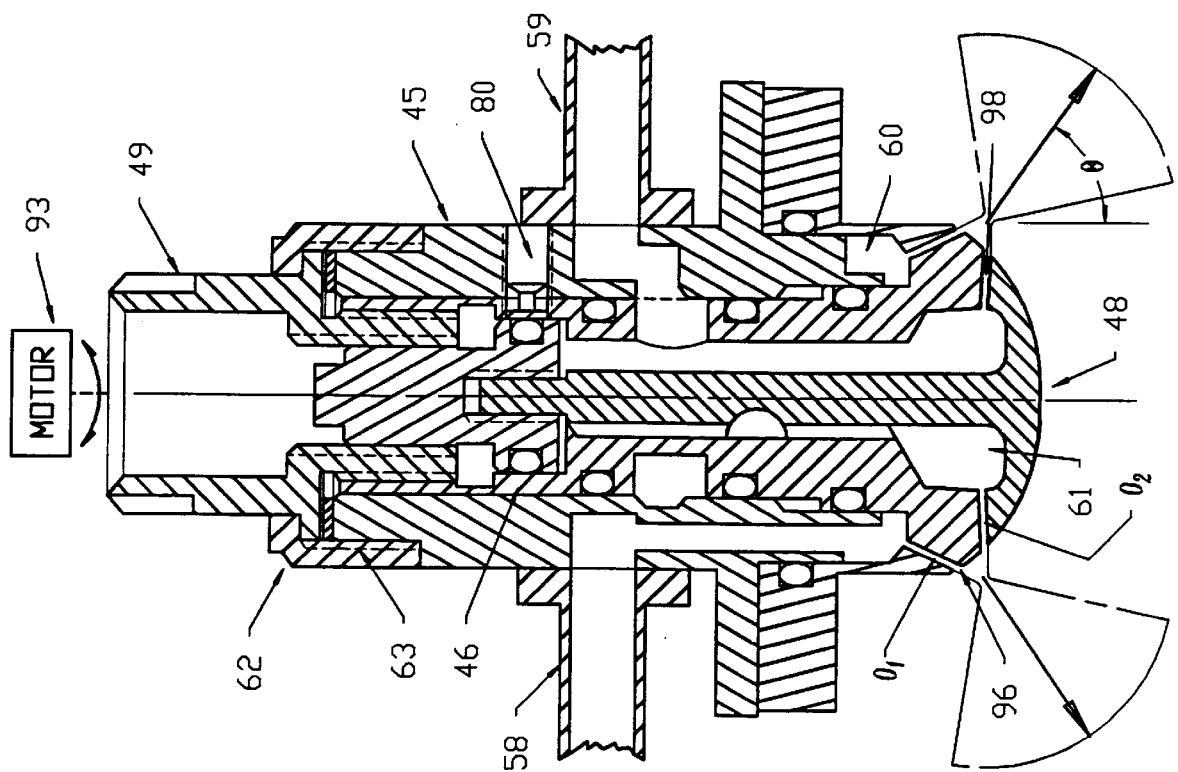
FIG. 3 is a fragmentary longitudinal vertical sectional view of one form of the improved dual concentric poppet valve, this view showing the first member as being movable relative to the body to vary the area of a first orifice, and further showing the second member as being movable relative to the first member to vary the area of a second orifice.

Referring now to FIG. 3, the improved dual concentric poppet valve, of which the presently-preferred form is generally indicated at 44, is shown as broadly including an assembled body 45, a first member 46 movably mounted on the body, a second member 48 movably mounted on the first member, and actuation means 49.

Figure 11:
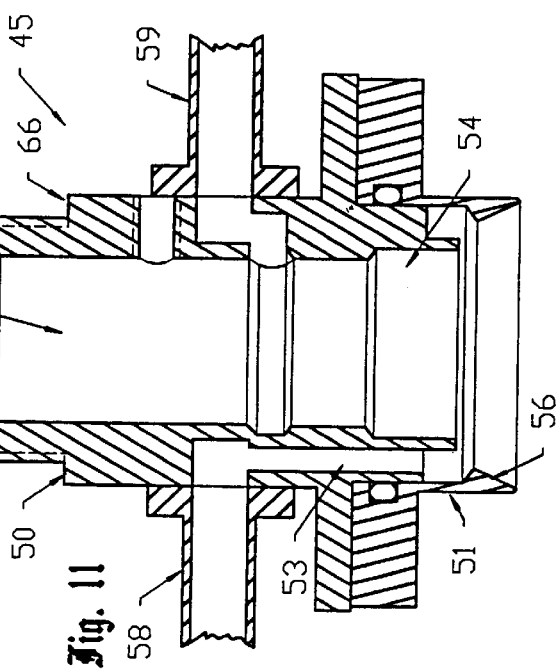
FIG. 11 is a reduced-scale vertical sectional view of the assembled body shown in FIG. 3.

As best shown in FIG. 11, body 45 is a vertically-elongated specially-configured multiple-part assembly. The body has an upper part 50 and a lower part 51, in order to permit separation of the internal fuel and oxidizer passages, 53 and 54, respectively. The significant features of the body assembly are the internal bore 55, which guides the first movable member 46, and the lower inwardly- and downwardly-facing frusto-conical outer poppet conical seat 56.

Two diametrically-opposite fittings are arranged to provide the two serviced fluids to various passageways extending into the body. The left fitting, generally indicated at 58, is generally in the form of a tube or conduit that is sealingly joined to the body member. Similarly, the right fitting, generally indicated at 59, is also in the nature of a tube or conduit that is sealingly joined to the body. The left fitting is adapted to provide fuel from a suitable source (not shown) to body passageway 53 that extends downwardly and opens into an annular chamber 60. Conversely, the right fitting is adapted to supply oxidizer from a suitable source (not shown) through the main bore of the body to an annular chamber 61 between the first and second members.

Figures 5, 6, 7, 8:
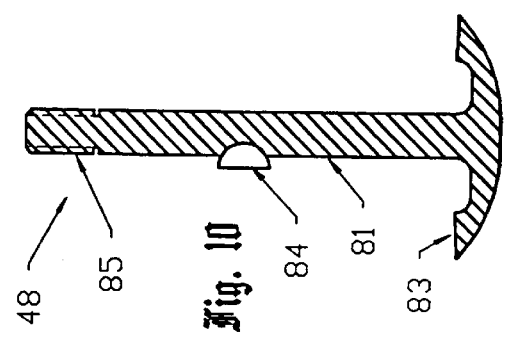
FIG. 5 is a reduced-scale vertical sectional view of the collar shown in FIG. 3.
FIG. 6 is a reduced-scale vertical sectional view of the actuator shown in FIG. 3.
FIG. 7 is a reduced-scale vertical sectional view of the bearing washer shown in FIG. 3.
FIG. 8 is a reduced-scale vertical sectional view of the coupling member shown in FIG. 3.

Adverting now to FIG. 3, a collar generally indicated at 62, is mounted on the body upper part, by means of screw thread 63, to hold the actuation means 49 in operative engagement therewith. As best shown in FIG. 5, collar 62 includes a downwardly-facing annular horizontal shoulder 64, suitably spaced from lower end face 65, that bottoms on an upwardly-facing annular horizontal shoulder 66 on the upper body so as to provide rotational clearance on the annular horizontal upper and lower bearing surfaces 68 and 69 (FIG. 6) of the actuation member 49.

Figures 9, 10:
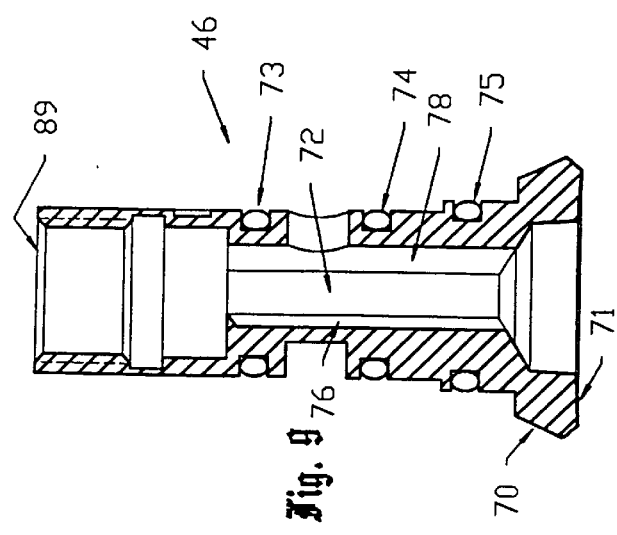
FIG. 9 is a reduced-scale vertical sectional view of the first member shown in FIG. 3.
FIG. 10 is a reduced-scale vertical sectional view of the second member shown in FIG. 3.

As best shown in FIG. 9, the first movable member 46 is a hollow tube provided with an outwardly- and upwardly-facing frusto-conical surface 70, a downwardly- and inwardly-facing frusto-conical surface 71, and poppet guide bore 72. A plurality of annular grooves extend radially into the first member at various axially-spaced locations along its outer surface to receive and accommodate a plurality of sliding O-ring seals 73, 74 and 75, respectively. The inner guide bore includes an anti-rotation vertical keyway 76, and a diametrically-opposite vertically-elongated flow passage 78. The outer cylindrical surface also includes a keyway slot 79, engaged by anti-rotation pin 80 (FIG. 3) which screws into the upper body.

As best shown in FIG. 10, the second member 48 is an inverted mushroom-shaped member having an upper stem portion 81, and a lower head portion 82. The lower head portion is provided with an upwardly- and outwardly-facing frusto-conical surface 83. The stem includes a key 84 which is adapted to be received in the keyway 76 in the first member 46 to prevent relative rotation therebetween. The upper end of stem 114 is externally threaded, as indicated at 85, for attachment to drive member 86.

Referring now to FIG. 6, the actuation means 49 is shown as being a tubular member having internal and external threads to actuate the inner and outer poppets respectively, and has axially-facing bearing shoulder surfaces 68 and 69. A bearing ring 88 is operatively arranged between actuation means surface 69 and body upper end face 89 to reduce the friction reaction of the poppet opening forces.

Referring now to FIG. 3, drive member 86 is operatively arranged to slide within the upper body, and serves to couple the actuating member 49 to the inner poppet stem 81. An annular groove extends into member 86 from its outer cylindrical surface 90 to receive and accommodate an O-ring 91 by which the joint between surface 90 and first member inner surface 92 may be sealed.

The various parts and components shown in detail in FIGS. 5–11 are assembled as shown in FIG. 3. A motor, schematically indicated at 93, is operatively coupled to the actuation member 49, and is arranged to selectively rotate the actuation member in the appropriate angular direction relative to the stationary body 45. It should be noted that the actuation member has an outer screw thread 94 and an inner screw thread 95 of different pitch, with the pitch of the inner screw thread being greater than the pitch of the outer screw thread. Thus, when the actuation means is rotated relative to the body, the first member 46 will be caused to move relative to the body by a first displacement gain. Because the pitch of inner screw thread 94 is greater than that of outer screw thread 95, the same common rotation of actuation member 49 will cause the second member to move axially at a greater displacement gain than the first member. Thus, by selectively designing the screw threads on the actuation member, the axial gains of the first and second members per unit rotation of the actuation means may be established in a desired ratio.

When the device is assembled as shown in FIG. 3, a first orifice $O_1$, is formed between body seat 56 and outer poppet valve surface 70, and a second orifice $O_2$ is formed between the outer poppet seat face 71 and the inner poppet valve surface 83. In the preferred embodiment, these respective facing and orifice-defining surfaces are arranged to be moved toward and away from one another simultaneously. A shim (not shown) may be provided between a shoulder on the inner poppet stem 81 and the drive member 86 so that, when the outer actuator thread pulls the outer poppet into contact with its mating seat 56, the inner poppet will simultaneously be caused to contact its mating seat 71.

By suitable choice of the relative pitch of the internal and external actuation threads, in combination with the selection of the inner and outer poppet seat angles, it is possible to establish the desired fluid jet angles and the desired fuel-to-oxidizer ratios over a wide range. As an example, if the inner poppet seat is at 90° to the poppet motion axis and the outer poppet seat is at 30°, the effective orifice opening rate (proportional to the perpendicular separation between the poppet and seat) will be twice as great for the inner poppet as for the outer poppet. However, the inner poppet displacement, parallel to the actuation axis, relative to its seat is the actual inner poppet displacement minus the outer poppet displacement. Thus, to provide a one-to-one orifice area ratio, it is necessary to displace the inner poppet 1.5 times the displacement of the outer poppet.

Figure 4:
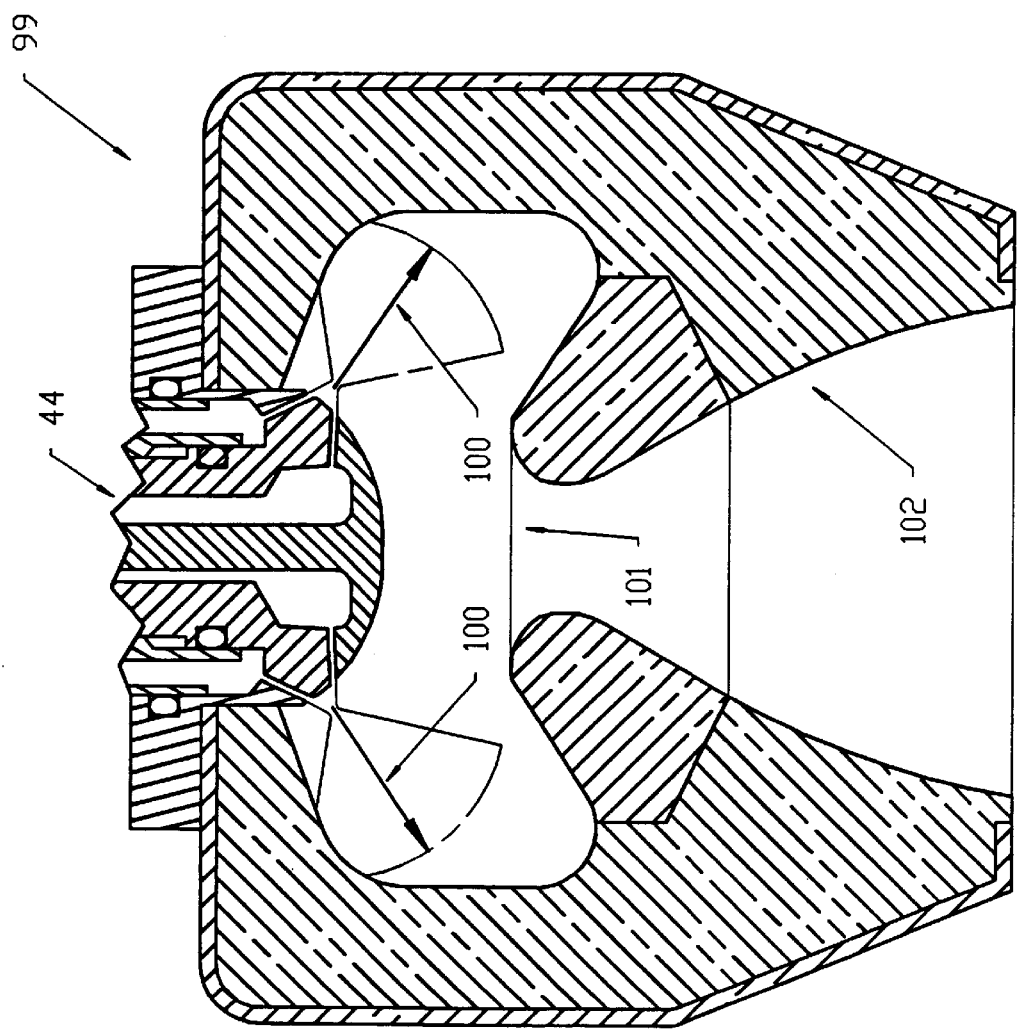
FIG. 4 is a fragmentary longitudinal vertical sectional view of a rocket engine, this view showing the lower marginal end portion of the injector depicted in FIG. 3 as being arranged in the combustion chamber.

FIG. 4 shows the lower marginal end portion of the improved device as being arranged within a rocket engine, generally indicated at 99. Here, the discharged sprays of fuel and oxidizer will mix to form an outwardly-directed annular discharge, indicated by arrows 100. The products of combustion then pass through a narrowed throat portion 101 and a shaped nozzle outlet 102 to provide thrust to the vehicle on which the engine is mounted.

Modifications

The present invention contemplates that various changes and modifications may be made. For example, the body need not necessarily be formed in the manner shown. The body may be formed of a single piece, or of multiple pieces subsequently assembled together. Similarly, the shape and configuration of the first and second members may be readily changed or varied. The actuation means is conveniently provided by means of differential screw threads. However, in other arrangements, the differential actuation means may be provided by other structures and mechanisms, such as levers or cams. As previously indicated, the various sealing surfaces defining the walls of the orifices need not necessarily engage one another in area contact when the orifices are closed. Line contact might be sufficient in other instances. While the preferred embodiment has been shown and described in connection with an injector for providing hypergolic fluids to a rocket engine, it should be readily apparent that the improved injector may be used with other fluids as well.

Accordingly, while the presently preferred form of the improved dual concentric poppet valve has been shown and described, and various changes and modifications thereof discussed, persons skilled in this art will readily appreciate that various additional changes and modifications may be made without departing from the spirit of the invention, as defined and differentiated by the following claims.

What is claimed is:

1. A dual concentric poppet valve, comprising:

a body having an opening therethrough and having a sealing surface surrounding said opening;

a first member mounted in said body opening for axial movement relative to said body, said first member having a first sealing surface arranged to be moved toward and away from said body sealing surface to define a first variable-area annular orifice therebetween, said first member having a concentric opening therethrough and having a second sealing surface surrounding said first member opening;

a second member mounted in said first member opening for co-axial movement relative to said first member, said second member having a sealing surface arranged to be moved toward and away from said first member second sealing surface to define a second variable-area annular orifice therebetween; and actuation means having a rotary motor, having a first screw-thread connection associated with said first member and operatively arranged to translate said first member relative to said body in response to operation of said motor, and having a second screw-thread connection associated with said second member and operatively arranged to simultaneously translate said second member relative to said first member in response to operation of said motor, the pitch of each screw-thread connection being selected so that the ratio of the opening areas of said first and second orifices remains substantially constant within an operating range of valve opening.

2. A dual concentric poppet valve as set forth in claim 1 including means for constraining said first member rotational movement relative to said body.

3. A dual concentric poppet valve as set forth in claim 1 including means for constraining said second member rotational movement relative to said first member.

4. A dual concentric poppet valve as set forth in claim 1 wherein said first sealing surface is adapted to selectively engage said body sealing surface to close said first orifice.

5. A dual concentric poppet valve as set forth in claim 1 wherein said second member sealing surface is adapted to selectively engage said first member second sealing surface to close said second orifice.

6. A dual concentric poppet valve as set forth in claim 4 wherein said second member sealing surface is adapted to selectively engage said first member second sealing surface to close said second orifice simultaneously with closure of said first orifice.

7. A dual concentric poppet valve as set forth in claim 1 wherein the pitch of said second screw-thread connection is greater than the pitch of said first screw-thread connection.

8. A dual concentric poppet valve as set forth in claim 1 and further comprising means for applying a pressurized first fluid to said first orifice, means for supplying a pressurized second fluid to said second orifice, and wherein said orifices are operatively arranged to mix the fluids discharged therethrough.

9. A dual concentric poppet valve as set forth in claim 8 wherein said first fluid is a fuel and said second fluid is an oxidizer.

* * * * *